United States Patent [19]

Hanawa

[11] Patent Number: 4,476,390

[45] Date of Patent: Oct. 9, 1984

[54] RADIATION DETECTOR HAVING RADIATION SOURCE POSITION DETECTING MEANS

[75] Inventor: Masatoshi Hanawa, Otawara, Japan

[73] Assignee: Tokyo Shibaura Denki Kabushiki Kaisha, Japan

[21] Appl. No.: 363,384

[22] Filed: Mar. 29, 1982

[30] Foreign Application Priority Data

Mar. 31, 1981 [JP] Japan .................................. 56-48022

[51] Int. Cl.³ ........................ G01T 1/18; G01N 21/00

[52] U.S. Cl. ........................................ 250/385; 378/21

[58] Field of Search .................. 250/385, 374; 378/19, 378/20

[56] References Cited

U.S. PATENT DOCUMENTS

| | | | |
|---|---|---|---|
| 4,031,396 | 6/1977 | Whetten et al. | 250/385 |
| 4,047,039 | 9/1977 | Houston | 250/385 |
| 4,047,040 | 9/1977 | Houston | 250/385 |
| 4,047,041 | 9/1977 | Houston | 250/385 |
| 4,051,379 | 9/1977 | Zacher, Jr. | 250/445 T |
| 4,055,767 | 10/1977 | Allemand | 250/385 |
| 4,075,491 | 2/1978 | Boyd | 250/445 T |
| 4,075,527 | 2/1978 | Cummings | 313/93 |
| 4,093,859 | 6/1978 | Davis et al. | 250/445 T |
| 4,119,853 | 10/1978 | Shelley et al. | 250/385 |
| 4,123,657 | 10/1978 | Krippner | 250/385 |
| 4,161,655 | 7/1979 | Cotic et al. | 250/385 |
| 4,190,771 | 2/1980 | Kamei | 250/385 |
| 4,193,000 | 3/1980 | Shirayama et al. | 250/385 |
| 4,217,498 | 8/1980 | Racz et al. | 250/385 |
| 4,217,499 | 8/1980 | Racz et al. | 250/445 T |
| 4,253,024 | 2/1981 | Peschmann | 250/374 |
| 4,260,891 | 4/1981 | Williams | 250/385 |
| 4,272,680 | 6/1981 | Cotic | 250/375 |
| 4,275,305 | 6/1981 | Racz et al. | 250/445 T |
| 4,276,476 | 6/1981 | Cotic | 250/385 |
| 4,297,576 | 10/1981 | Laval et al. | 250/336 |
| 4,301,368 | 11/1981 | Riihimaki | 250/385 |
| 4,303,863 | 12/1981 | Racz et al. | 250/385 |
| 4,306,155 | 12/1981 | Cotic | 250/385 |
| 4,345,156 | 8/1982 | Ishikawa | 250/385 |
| 4,376,893 | 3/1983 | Whetten | 250/385 X |

*Primary Examiner*—Alfred E. Smith

*Attorney, Agent, or Firm*—Cushman, Darby & Cushman

[57] ABSTRACT

Disclosed is a radiation detector provided at both ends with radiation source position detecting means each including three to five electrode plates in which a bias electrode plate centrally disposed has cover layers on both surfaces, and signal electrode plates disposed on both sides of the bias electrode plate each have a cover layer on only one surface farther from the bias electrode plate. Material of the cover layer has a smaller secondary electron emissive power than that of the material of the electrode plates with respect to incident radiation.

20 Claims, 14 Drawing Figures

RADIATION DETECTOR HAVING RADIATION SOURCE POSITION DETECTING MEANS

BACKGROUND OF THE INVENTION

The present invention relates to a radiation detector for use in a computerized tomography apparatus.

One conventional computerized tomography apparatus displays a picture of the cross section of an object, such as a human body, by using radiation such as X-rays.

This conventional apparatus, as shown in FIG. 1 or 2, is made up of an X-ray source 1 for radiating a fan-shaped X-ray beam FX and an X-ray detector 2 having an array of X-ray sensing cells, which is disposed in opposition to the X-ray source 1. An object P is disposed between both the devices 1 and 2. FIG. 2 illustrates the situation when an expanding angle $\theta 2$ between boundary X-rays is narrower than angle $\theta 1$ of FIG. 1. The source 1 and the detector 2 rotate about the object P along the same peripheral locus, in the same direction, and at the same angular velocity, thereby collecting X-ray projection data of the cross section of the object from every angular location of the object. The collected data is converted into an electrical signal which in turn is analyzed by a computer to calculate absorption indices of the X-rays at every location on the cross section of the object. A picture of the object's cross section is reconstructed by providing tone values corresponding to the absorptance to the display section. The apparatus thus constructed can provide a clear tomogram for soft to hard organisms.

The X-ray detector 2 has a number of sensing cells each consisting of two bias electrode plates and a signal electrode plate which are alternately disposed and filled with ionizable gas, for example, xenon, at high pressure. The X-ray transmitted through the object P projects into every cell constituting an ion chamber where the X-ray energy is detected as an ionization current. The ionization current of each X-ray path (a path connecting the source 1 and the sensing cell) is integrated with respect to time. The integrated value of current is discharged through a discharge circuit of a given time constant. The discharge time is then used for the X-ray tomographying data in each X-ray path. In this way, when the data collection at one position on the peripheral locus is completed, those devices in advance of the next position effect similar data collection.

An example of a radiator detector of the multichannel type is illustrated in FIGS. 3 to 6. A body 3 of the detector has a cavity 4 for accommodating a number of electrodes and an X-ray permeable window 5 in which the side wall on the incident side is partially thinned when compared to the remaining wall. The side wall extends through to an expanding angle $\theta$ of the fan-shaped X-ray beam so as to enable the X-ray's energy to reach the internal sensing cells in a sufficient amount. The cavity 4 containing the sensing cells is covered with a cover 6 and filled with ionizing gas, e.g. xenon, at high pressure. Further, in the cavity 4, signal electrode plates 10 for signal sensing and bias electrode plates 11 for applying high voltage are alternately disposed, as shown in FIG. 5. These plates 10 and 11 are firmly fitted at the upper and lower ends in the corresponding grooves of support members 12, ensuring that they exhibit the same given intervals or pitches. One signal electrode plate 10 and two bias electrode plates 11 located on both sides of the former make up a sensing cell.

A number of sensing cells are housed in the cavity 4 of the body 3, as shown in FIG. 6. The bias electrode plates 11 are connected to a single lead wire 14 for high voltage application. The signal electrode plates 10 are connected to each lead wire 13 for leading signals from the cells to the exterior.

In the computerized tomography apparatus, the radiation source and the radiation detector must be located at a given location with high precision in order to obtain an excellent picture of the cross section of the object. Specifically, the sensing cells of the radiation detector must be arranged so as to sufficiently cover the expanding angle $\theta$ of the fan-shaped radiation from the radiation source. Further, the sensing cells must be arranged in parallel with radial lines extending from the radiation source so as to effectively detect the radiation. Generally, the sensing cells are designed and prefabricated so that their openings are directed towards the radiation source. Therefore, it is acceptable to merely set the focal point of the radiation source to coincide with the cross point of each cell in the direction of their openings. When there is an error in the positioning of the radiation source, the opening direction of the sensing cell deviates from the direction of the incoming radiation. As a result, the apparatus incorrectly detects the energy of the incident radiation to provide an artifact as a virtual image in the picture formed. For this reason, it is necessary to ensure accurate alignment in the optical system including the radiation source and the detector. Nevertheless, there has been no method to accurately measure an amount of the positional deviation of the radiation source from its correct position. The positioning of the radiation source depends solely on the operator's skill and his experiance. Therefore, the positioning work is difficult and time-consuming.

SUMMARY OF THE INVENTION

Accordingly, an object of the present invention is to quantitively measure amount of an alignment deviation in an optical system for a computerized tomography apparatus.

Another object of the present invention is to provide a radiation detector with a means for qualitatively measuring an amount of position deviation of the radiation source.

According to the present invention, there is provided a radiation detector of the multichannel type having at both ends radiation source position detecting means including at least one deviation detecting cell made up of 3 to 5 electrode plates alternately disposed containing bias electrode plates and signal electrode plates. The central electrode plate of those plates is the bias electrode plate which includes cover layers on both surfaces. In each of the remaining plates, either both of the surfaces have a cover layer or both have no layer. In arranging these electrode plates, the surface having the cover layer and the surface having no cover layer are alternatively disposed. The cover layer is made of metal having a smaller secondary electron emissive power for the incident radiation than that of the material of the electrode plate.

According to the radiation detecter, incident angles of the radiation incident on two deviation detecting cells can be obtained by making use of a difference between the secondary electron emissive powers of the faces of the electrode plates of the deviation detecting cell.

Accordingly, an amount of positional deviation of the radiation source can be easily obtained by using the incident angles.

DETAILED DESCRIPTION OF THE PREFERRED EMBODIMENTS

Figure 1:
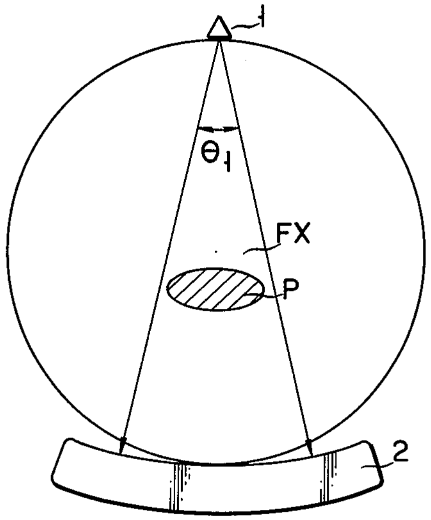
FIG. 1 PRIOR ART
FIGS. 1 and 2 illustrate an example of a computerized tomography apparatus.
Figure 2:
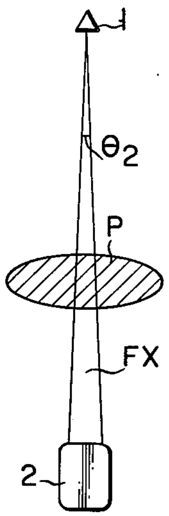
FIG. 2 PRIOR ART
Figure 3:
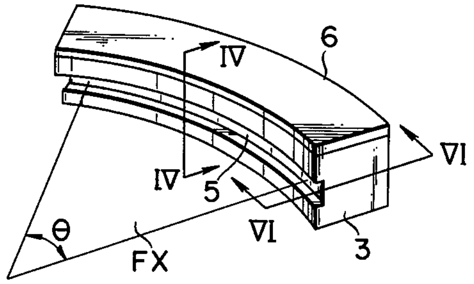
FIG. 3 PRIOR ART
FIG. 3 is a perspective view of a normal radiation detector.
Figure 4:
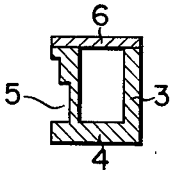
FIG. 4 PRIOR ART
FIG. 4 is a cross sectional view taken along line IV—IV in FIG. 3, omitting the internal electrodes.
Figure 5:
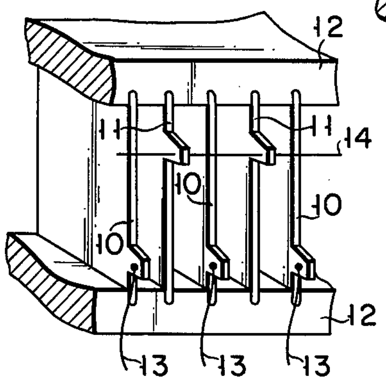
FIG. 5 PRIOR ART
FIG. 5 is a perspective view patially illustrating a group of electrodes of a normal radiation detector.
Figure 6:
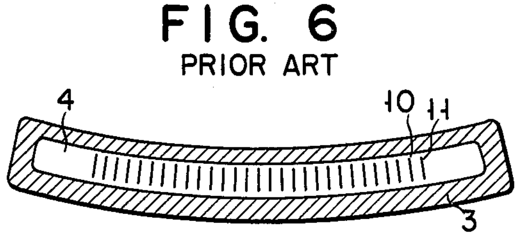
FIG. 6 PRIOR ART
FIG. 6 is a cross sectional view taken along line VI—VI in FIG. 3.
Figure 7:
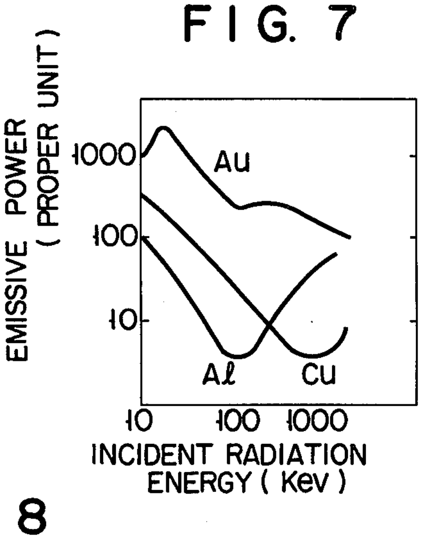
FIG. 7 is a graphical representation of a relationship of radiation energy and the secondary electron emissive power of the materials of electrode plates and the layer.

When radiation, e.g. X-rays, hits metal, the metal emits secondary electrons. The secondary electron emissive powers of some metals are illustrated in FIG. 7. Normally, the radiation used in a computerized tomography apparatus reaches a detector, keeping energy of about 70 to 80 keV. Accordingly, in this energy range, the emissive power is larger as the atomic number of the material is larger, as seen from FIG. 7. The present invention measures a deviation amount in alignment in an optical system by making use of a secondary electron emissive power difference between these materials, and successfully adjusts the deviation.

Figure 8:
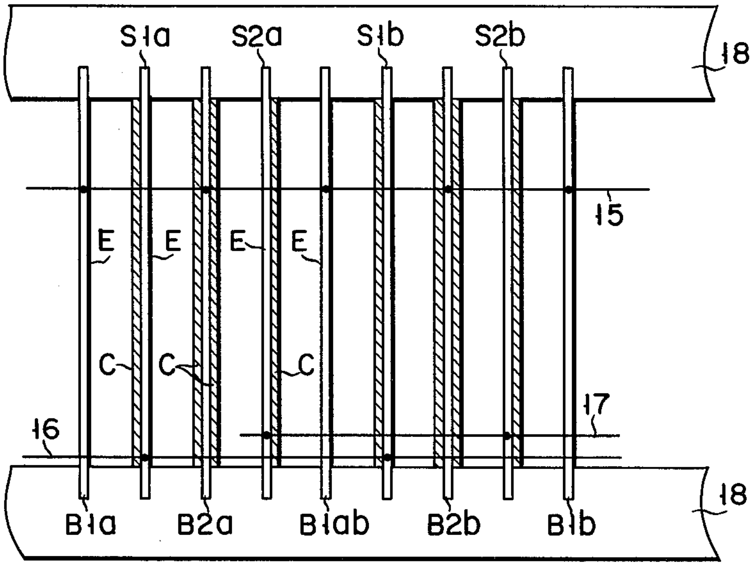
FIG. 8 is a front view illustrating the electrode group constituting sensing cell according to the present invention.

The electrode plates used for the deviation sensing cell are made of material with a large secondary electron emissive power, for example, molybdenum, tungsten and tantalum, enabling the minimization of crosstalk. A cover layer formed on a given surface of the electrode plate is made of metal with smaller secondary electron emissive power than that of the material of the electrode plate, such as aluminum, nickel, and copper. The cover layer may be formed on the surface by the deposition or plating process or by bonding a metal sheet on the surface of the electrode plate by proper adhesive. The preferable thickness of the cover layer ranges between 10 and 50 microns. A practical arrangement of a position detecting means for detecting a position of the radiation source is illustrated in FIG. 8. As shown, bias electrode plates $B2_a$ and $B2_b$ have cover layers C on both surfaces, and the remaining bias electrodes plates $B1_a$ and $B1_{ab}$, and $B1_b$ each have no cover layer on both surfaces. These bias plates are connected to a single lead wire 15 for high voltage application. Signal electrode plates $S1_a$, $S2_a$, $S1_b$ and $S2_b$ have cover layers C on only one of their respective surfaces. The electrode plates are so arranged that the cover layers do not face each other, that is, the cover layer C of one electrode plate faces the exposed surface E having no cover surface of the adjacent electrode plate. The five electrode plates $B1_a$, $S1_a$, $B2_a$, $S2_a$, and $B1_{ab}$ form one deviation sensing cell. The remaining five electrode plates $B1_{ab}$, $S1_b$, $B2_b$, $S2_b$ and $B1_b$ form another deviation sensing cell. The electrode plates $S1_a$ and $S1_b$ located at the corresponding positions of the two deviation sensing cells are connected together to a single lead wire 16 for leading out a signal. The signal electrode plates $S2_a$ and $S2_b$ are connected together to another lead wire 17 of the same purposes. In the perferable embodiment, the electrode plate is made of molybdenum and is coated with copper. The electrode plates are fixed to the supporting plates 18 at fixed intervals. The two deviation sensing cells employed in the embodiment may of course be replaced by a single one.

Figure 9:
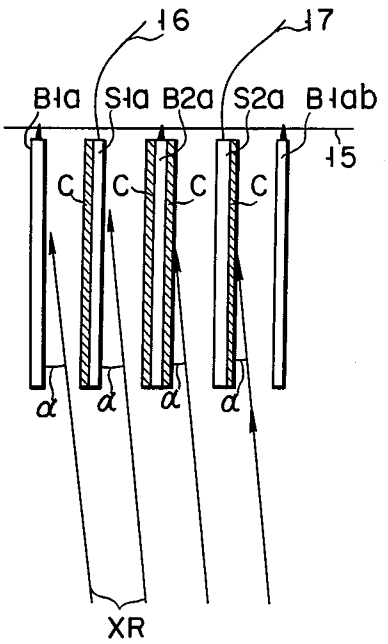
FIG. 9 is a schematic diagram illustrating a relationship between the electrode plates of the deviation sensing cell of the present inventions and the incident radiation.

A system to obtain an amount of positional deviation of the radiation source in a single deviation sensing cell containing five electrode plates shown in FIG. 9, will be described. The construction of the sensing cell is the same as that in FIG. 8. FIG. 9 illustrates a situation where the X-ray source deviates from its predetermined position and as a result, the X-ray XR obliquely projects into the sensing cell at an incident angle $\alpha$ (defined between each electrode plate and the incident X-ray). Upon receipt of the X-ray, each electrode plate per se or its cover layer emits secondary electrons according to its emissive power. The current $I'(\alpha)$ caused by the secondary electrons, together with the ionization current $I^{\circ}(\alpha)$ arising from the ionizing the gas filled, is detected by the electrode plate. To be more specific, the output current $I_1$ measured at the signal electrode plate $S1_a$ contains the ionization current $I_1^{\circ}(\alpha)$ due to ionization of the gas filling the space between the bias electrode plates $B1_a$ and $B1_b$ and the current $I_1'(\alpha)$ of the secondary electrons produced when the X-ray impinges on the bias electrode plate $B1_a$ and the signal electrode plate $S1_a$. The output current $I_2$ measured by the signal electrode plate $S2_a$ contains the ionization current $I_2^{\circ}(\alpha)$ due to ionization of the gas filling a space between the bias electrode plates $B2_a$ and a $B1_{ab}$ and the current $I_2'(\alpha)$ caused by the secondary electrons produced when the X-ray hits the cover layer C of each of the bias electrode plate $B2_a$ and the signal electrode plate $S2_a$.

The currents $I_1^{\circ}(\alpha)$ and $I_2^{\circ}(\alpha)$ are each dependent on the effective volume between the electrode plates. The effective volumes are essentially equal to each other. Since the gas volume, ionized in proportion to the increase of the incident angle $\alpha$ of the X-ray, decreases, the currents $I_2^{\circ}(\alpha)$ and $I_2^{\circ}(\alpha)$ also decrease, and hence the amounts of their decreases are equal to each other. Accordingly, the following relation holds $$I_1^{\circ}(\alpha)=I_2^{\circ}(\alpha).$$

The currents $I_1'(\alpha)$ and $I_2'(\alpha)$ are related by $I_1'(\alpha)>I_2'(\alpha)$ since there is a difference between the emissive powers of the electrode plate and the cover layer. Further, an amount of the secondary electrons is proportional to an amount of the X-ray hitting the exposed surface of the electrode plate or the cover layer. Therefore, the current $I_1'$ ($\alpha$) and $I_2'$ ($\alpha$) increase with increase of the incident angle $\alpha$, and mathematically expressed by $$I_1'(\alpha)\propto\alpha,\ I_2'(\alpha)\propto\alpha.$$

When $\alpha=0$, no secondary electrons are emitted, and hence $I_1'(0)=I_2'(0)=0$. Therefore, $I_1=I_2=I_1^\circ(0)=I_2^\circ(0)$. A relationship between the currents $I_1$ and $I_2$ and the incident angle $\alpha$ of the X-ray is as shown in FIG. 10.

Figure 10:
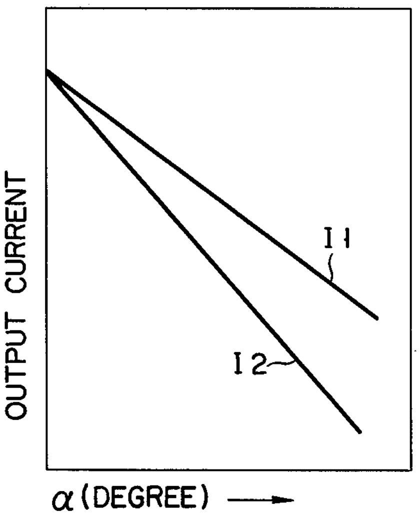
FIG. 10 graphically illustrates a relationship between an incident angle of radiation and a signal current.
Figure 11:
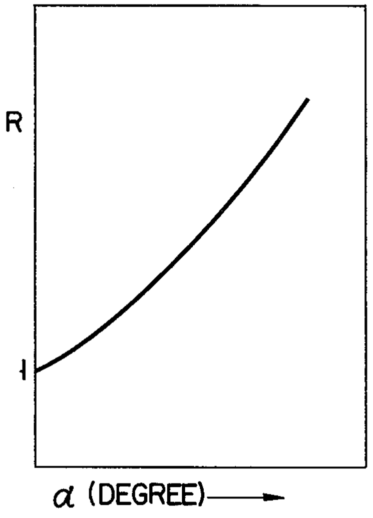
FIG. 11 is a graph illustrating an incident angle and the ratio of signal currents obtained from two signal electrode plates.
Figure 12:
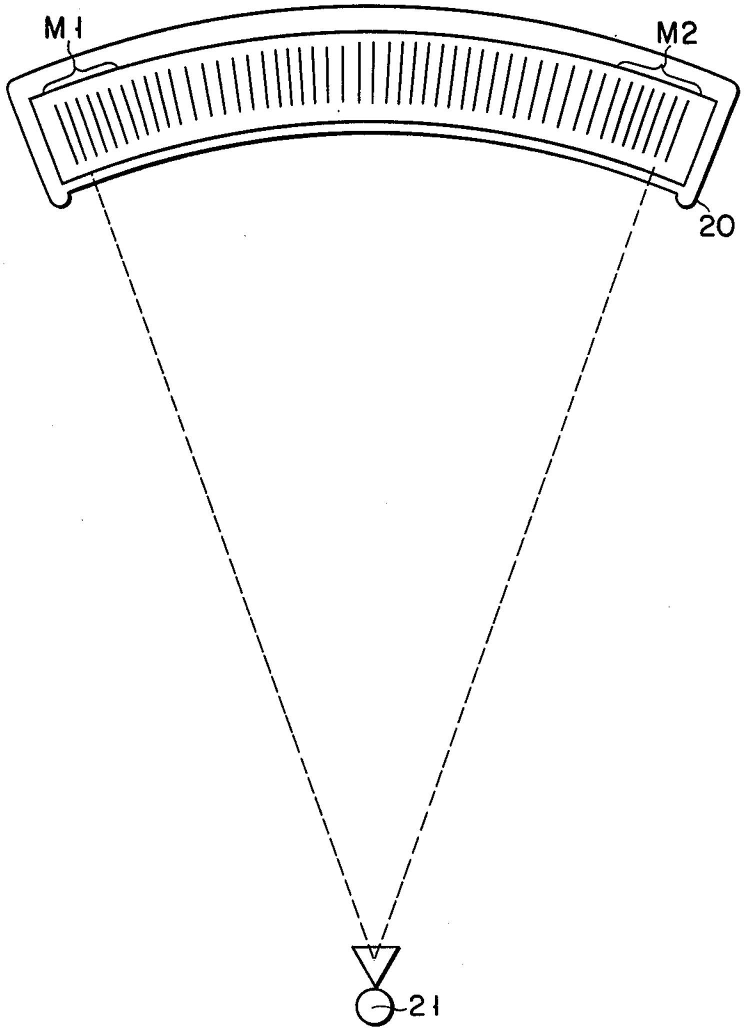
FIG. 12 is a schematic diagram of a radiation detector unit with deviation detecting cells at both ends according to the present invention.

A ratio $R=I_1/I_2$ of the output currents $I_1$ and $I_2$ obtained from the graph in FIG. 10 is plotted against the incident angle $\alpha$, as shown in FIG. 11, forming a reference curve between them. Therefore, if the reference curve of a specific position detecting means is performed, as shown in FIG. 11, the incident angle $\alpha$ of the X-ray can be obtained by measuring the ratio R of the output currents when the position detecting means is assembled into the X-ray detector newly manufactured or before it is used. More specifically, electrode groups constituting position detecting means $M_1$ and $M_2$ are installed at both ends of the X-ray detector 20, as shown in FIG. 12. The electrode group between the means $M_1$ and $M_2$ is for collecting X-ray data absorbed by the object. It is possible to obtain an amount of deviation (as a coordinate value) from a correct position of the X-ray source 21 by using an incident angle $\alpha$ obtained by the position detecting means $M_1$ on the left side and the incident angle $\alpha$ by the position detecting means $M_2$ on the right side. Therefore, the deviated position of the radiation source 21 is easily adjusted to the correct position on the basis of the deviation amount.

In the above embodiment, the sensing cell is comprised of five electrode plates shown in FIG. 9. As seen from the foregoing description, the deviation amount or the incident angle of the X-rays can be obtained when the current caused by the secondary electrons emitted from the electrode plate per se and the cover layer can be measured by separate signal electrodes. Therefore, the sensing cell may be formed by electrode plates of three minimum, that is, the bias electrode plate $\mathbf{B2}_a$ with cover layers on both surfaces and two signal electrode plates $\mathbf{S1}_a$ and $\mathbf{S2}_a$ disposed adjacent to both sides of the former and having the cover layer on only one of the surfaces thereof. In this case, the amount of the output current from the detecting cell is half that of the cell shown in FIG. 9. Alternately, the sensing cell can be formed using a bias electrode plate, for example, $\mathbf{B1}_a$, disposed outside one of the signal electrodes, for example, $\mathbf{S1}_a$, in addition to three electrode plates $\mathbf{B2}_a$, $\mathbf{S1}_a$ and $\mathbf{S2}_a$. In this modification, the output current from the signal electrode plate $\mathbf{S2}_a$ is half that from the signal electrode plate $\mathbf{S1}_a$. Accordingly, the output current from the former must be corrected to be double.

Figure 13:
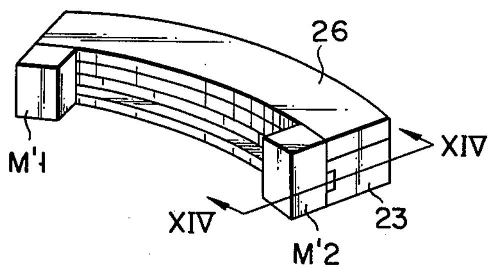
FIG. 13 is a perspective view of another embodiment of a radiation detector according to the present invention.
Figure 14:
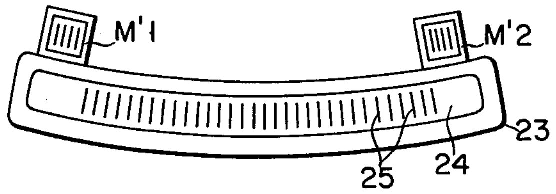
FIG. 14 is a cross sectional view taken on line XIV—XIV in FIG. 13.

In an embodiment shown in FIGS. 13 and 14, the position detecting means $M_1'$ and $M_2'$ are fabricated individually and those are attached to the incident surface side of both ends of the X-ray detector. The detector is provided with a usual electrode group 25 for collecting radiation absorbed data of the object accommodated in the cavity 24 of the body 23, and is filled with high pressure gas with the assistance of a lip 26. This embodiment allows the position detecting means to be separable from the detector, if necessary.

As described above, the deviation of the radiation source of the computerized tomography apparatus can qualitatively be obtained using the radiation detector of the present invention. This feature ensures correct positioning of the radiation source and provides an excellent picture of the cross section of the object.

What is claimed is:

1. A multichannel radiation detector comprising a body, radiation source position detecting means disposed at each end of the body for detecting the position of a radiation source, each of said radiation source position detecting means having at least one positional deviation sensing cell including a grouping of three to five electrode plates, said grouping having alternately disposed bias and signal electrode plates, wherein the central electrode plate of said grouping is a bias electrode plate having a cover layer on both surfaces while predetermined ones of the remaining electrode plates of said grouping have a cover layer on only one surface thereof, said cover layer of said central electrode plate and said predetermined ones of the remaining electrode plates being a material having a smaller secondary electron emissive power for the incident radiation than that of the material of said respective electrode plates, and wherein said electrode plates of said groupings are disposed so that respective cover layers face the exposed surface of the adjacent electrode plate.

2. A radiation detector according to claim 1, wherein said deviation sensing cell includes a grouping of three electrode plates, the central bias electrode plate of said grouping having a cover layer on both surfaces, thereof wherein the remaining two adjacent signal electrode plates each have a cover layer on only one of the surfaces thereof, and wherein said one surface of each of said signal electrode plates is farther from said central electrode plate than the other exposed surface thereof.

3. A radiation detector according to claim 1, wherein said deviation sensing cell includes a grouping of four electrode plates, the central bias electrode plate having a cover layer on both surfaces, a pair of signal electrode plates each disposed on a respective side of said bias electrode plate and having a cover layer on one of the side surfaces thereof farther from said bias electrode plate than the other exposed surface, and a second bias electrode plate having exposed surfaces disposed on the outside of either one of said signal electrode plates.

4. A radiation detector according to claim 1, wherein said deviation sensing cell includes a grouping of five electrode plates having a central bias electrode plate with a cover layer on both side surfaces, a pair of signal electrode plates each disposed on a respective side of said bias electrode plate and having a cover layer on one of the surfaces thereof farther removed from said bias electrode plate than the other of the surfaces, and a pair of second bias electrode plates having exposed surfaces and being disposed on the outside said pair of signal electrode plates.

5. A radiation detector according to claim 1 or 4 having two or more adjacent deviation sensing cells operatively coupled in series, and wherein said adjacent deviation cells share one bias electrode plate having exposed surfaces.

6. A radiation detector according to claim 1, wherein the material of said electrode plate is molybdenum, tungsten or tantalum.

7. A radiation detector according to claim 1, wherein the material of said cover layer is aluminum, nickel or copper.

8. A radiation detector according to claim 1 or 7, wherein the thickness of said layer ranges from 10 to 50 microns.

9. A radiation detector according to claim 1, wherein said radiation source position detecting means is integral with said body of the radiation detector.

10. A radiation detector according to claim 1, wherein said radiation source position detecting means is mounted to the side of said body of the radiation detector exposed to incident radiation.

11. Means for detecting the position of a radiation source comprising a sensing cell including a grouping of plural electrode plates formed of a material which exhibits a predetermined secondary electron emissive power, said grouping including at least a central bias electrode plate having a cover layer on both surfaces thereof and a pair of signal electrode plates each disposed on a respective side of said central bias electrode and each having an exposed surface and a cover layer on the other surface, said exposed surface of each of said pair of signal electrode plates being in opposing relationship to a respective cover layer of said central bias electrode, said cover layers of said central bias electrode plate and said signal electrode plates being formed of a material which exhibits a secondary electron emissive power less than said predetermined secondary electron emissive power, whereby the position of said radiation source is detected by determining the difference between said secondary electron emissive power of said electrodes and said predetermined secondary electron emissive power.

12. Means as in claim 11 wherein said grouping further includes at least one second bias electrode plate, said second bias electrode plate having both surfaces exposed and being disposed in said cell to the outside of a predetermined one of said signal electrode plates so that one of the exposed surfaces of said second bias electrode is in opposing relationship to the cover layer of said predetermined one of said signal electrode plates.

13. Means as in claim 11 wherein said grouping further includes a pair of second bias electrode plates each having both surfaces thereof exposed, said pair of second bias electrode plates being disposed in said cell to the outside of said pair of signal electrode plates so that a predetermined one of the exposed surfaces of each of said second bias electrode plates is in an opposing relationship to the cover layer of a respective one of said pair of signal electrode plates.

14. Means as in claim 11, 12 or 13 comprising at least a pair of second sensing cells serially interconnected to one another.

15. Means as in claim 11, 12 or 13 wherein the material of said electrode plates is molybdenum, tungsten or tantalum.

16. Means as in claim 11, 12 or 13 wherein the material of said cover layers is aluminum, nickel or copper.

17. Means as in claim 16 wherein the thickness of said cover layers is between 10 to 50 microns.

18. Means as in claim 11 wherein the thickness of said cover layers is between 10 to 50 microns.

19. In combination with a multichannel radiation detector, means as in claim 11, 12 or 13.

20. The combination as in claim 19 wherein said means is integral with said radiation detector.

* * * * *